United States Patent Office 3,640,907
Patented Feb. 8, 1972

3,640,907
SHAPED BODIES RESISTANT TO OXIDATION, PARTICULARLY ELECTRIC RESISTANCE ELEMENTS
Venanzio Bizzarri, Hallstahammar, Sweden, assignor to Aktiebolaget Kanthal, Hallstahammar, Sweden
No Drawing. Filed Feb. 27, 1969, Ser. No. 803,095
Int. Cl. C04b 35/50; H01b 1/06
U.S. Cl. 252—521
7 Claims

ABSTRACT OF THE DISCLOSURE

A dense shaped body which is resistant to oxidation and to temperatures in excess of 1700° C. is disclosed, consisting essentially of molybdenum silicide and having an oxide component of from about 1% to 12% based upon weight of the silicide, the oxide component containing about 1% to 10% thorium oxide by weight of the silicide, and a bonding means which is formed by sintering an alkali clay of the montmorillonite group, the clay containing less than about 0.7% sodium by weight of the oxide component.

---

The present invention relates to a dense oxidation resistant shaped body, particularly intended for electrical resistance elements and produced in a powder metallurgical way, substantially by molybdenum silicide as well as an oxide component including thorium oxide.

It is a well known fact that thorium oxide is resistant against heating to high temperatures and it has thus been proposed to add this oxide in powder metallurgical production of shaped bodies of molybdenum silicide. Then $MoSi_2$ is mixed with an oxide component including thorium oxide ($ThO_2$) and a plasticizing bonding means of a clay of the montmorillonite group. The mass obtained is shaped and sintered. It has, however, been found that such a body is not resistant to very high temperatures because the bonding means forms a glass having a comparatively low softening temperature which is substantially below 1700°, e.g. below 1550° C. It has been found that this depends in the first instance on the content of alkali in the bonding means. In other words the high heat resistivity of the thorium oxide has not been utilized any better than if other high melting oxides had been used instead in the oxide component.

Surprisingly enough it has been found that if an oxide component amounting to 1 to 12%, preferably 3 to 8%, of the weight of the molybdenum silicide and consisting of 1 to 10% thorium oxide also referred to the molybdenum silicide is included, if desired, together with bonding means in the nature of a clay of the montmorillonite group which has been pretreated or selected so that the content of sodium oxide ($Na_2O$) therein has a value below 0.7% by weight as referred to the oxide component the finally sintered body will have a considerably higher resistance to heat than any hitherto known bodies of this kind. If the body has cylindrical shape with a diameter of 6 mm. and is tested continuously as an electric heating element with a surface load of 9 watts/sq. cm. at 1800° C. in air it will have a life of 750 hours.

The thorium oxide content may advantageously fall within the range of 2 to 3% of the weight of the silicide component. It is desirable that the content of iron and aluminum in the molybdenum silicide is each at most 0.3%, preferably at most 0.15%, by weight of the silicide.

The removal of alkali from the bonding means is driven so far that the content of $Na_2O$ will be below about 0.7% by weight, preferably 0.4%, as referred to the weight of the oxide component. The content of $Na_2O$ in the clay should be reduced to a value below 1% of the weight of the clay. The content of $K_2O$ may in the same way be brought down to a value below 0.3% by weight. Also the content of CaO is reduced, preferably to a value below 0.5% by weight, also referred to the oxide component.

The manufacture of shaped bodies of molybdenum silicide with bonding means of a mineral belonging to the montmorillonite group, particularly bentonite, is described e.g. in the U.S. Pat. 3,027,331. The reduction of the alkali content in the bonding means may be carried out, for instance by treating it with ammonium ions according to the description in the U.S. Pat. 3,395,029.

EXAMPLE

A resistance element to be used at 1800° C. in air is manufactured in the following way.

To 100 parts of molybdenum silicide is added 2.5 parts of $ThO_2$ and the mixture is ground for a time of 120 hours in benzine, which is a longer time than the usual grinding time of 72 hours. The distribution of the grain sizes affords a curve which deviates from the curve valid in the ordinary manufacture, for instance, according to U.S. Pat. 3,027,331, whereby a greater width in the distribution of the different grain size classes is obtained.

The manufacture of the bentonite mass is made according to the Pat. 3,395,029 i.e. the plasticizing properties of the bentonite being lost in the ion exchange are restored by mixing a monohydric alcohol into the mass. To 100 parts of the ground mixture of $MoSi_2$ and $ThO_2$ 5 parts bentonite counted as dry weight is added, whereupon the mass is kneaded and extruded so as to form rods which are dried.

To keep the oxide content low the rods are presintered at 1500 to 1700° C. in hydrogen gas for four minutes, whereupon the subsequent final sintering in air is carried out at 1640 to 1650° C. for one minute.

The material obtained in this way has the following composition i.e. 89.9% by weight silicide component and 10.1% by weight oxide component.

The composition of the silicide component:

| | Percent by weight |
|---|---|
| Mo | 64.2 |
| Si | 35.6 |
| Al | Less than 0.15 |
| Fe | 0.20 |

The composition of the oxide component:

| | Percent by weight |
|---|---|
| $SiO_2$ | 58.60 |
| $Al_2O_3$ | 10.80 |
| CaO | 0.30 |
| MgO | 1.40 |
| $Na_2O$ | 0.20 |
| $K_2O$ | 0.15 |
| $ThO_2$ | 25.10 |
| $Fe_2O_3$ | 2.50 |

The specific weight of the material was found to be 5.72 grams/cm.[3] and the bending strength 41.0 kp./mm.[2].

When a resistance element of $MoSi_2$, for instance according to the invention, is used at high temperatures up to 1700° C. while resting on a bed, it is very important that this is sufficiently heat resistant. Preferably the bed is made in the form of a plate of sintered thorium oxide. As this substance is a bad heat conductor it should be rather thin, e.g. only 2 to 3 mm. thickness. This plate may be supported in turn by a layer of aluminium oxide grains or by a sintered plate based on aluminium oxide which constitutes a better heat conducting support.

What I claim is:

1. A dense, shaped body resistant to oxidation and high temperature consisting essentially of molybdenum silicide, an oxide component of about 1% to 12% based upon weight of the silicide, the oxide component containing about 1% to 10% thorium oxide by weight of the silicide and a bonding means formed by the sintering of an alkali clay of the montmorillonite group, the clay containing less than about 0.7% sodium oxide by weight of the oxide component.

2. A body according to claim 1 containing 3 to 8% oxide component by weight of the silicide.

3. A body according to claim 1 wherein the oxide component contains 2 to 3% thorium oxide by weight of the silicide.

4. A body according to claim 1 wherein the oxide content in the clay is less than about 0.4% for sodium oxide, 0.3% for potassium oxide and 0.5% for calcium oxide by weight of the oxide component.

5. A body according to claim 1 wherein both the amounts of iron and aluminum in the silicide each does not exceed 0.30% by weight of the silicide.

6. A body according to claim 5 wherein both the amounts of iron and aluminum in the silicide each does not exceed 0.15% by weight of the silicide.

7. A body according to claim 1 wherein the alkali clay is bentonite.

References Cited
UNITED STATES PATENTS

| | | | |
|---|---|---|---|
| 2,745,928 | 5/1956 | Glaser | 252—518 |
| 3,027,330 | 3/1962 | Schrewelius | 252—518 |
| 3,027,331 | 3/1962 | Schrewelius | 252—518 |
| 3,275,572 | 9/1966 | Ruben | 252—518 |

DOUGLAS J. DRUMMOND, Primary Examiner

U.S. Cl. X.R.

252—518